United States Patent [19]

Mosby

[11] Patent Number: 4,715,172
[45] Date of Patent: Dec. 29, 1987

[54] HARVESTING MACHINE WITH TWIN HEADERS

[76] Inventor: Ewen Mosby, Box 336, Hartney, Manitoba, Canada, R0M 0X0

[21] Appl. No.: 886,176

[22] Filed: Jul. 16, 1986

[30] Foreign Application Priority Data

Jul. 24, 1985 [CA] Canada .................................. 487410

[51] Int. Cl.⁴ ..................... A01D 73/00; A01B 49/00
[52] U.S. Cl. ........................................ 56/228; 56/220; 56/14.5; 56/162; 172/311
[58] Field of Search ................. 56/228, 219, 220, 297, 56/14.5, 14.6, 15.7, DIG. 9, 159, 162; 172/311, 456, 662, 776; 280/415 R, 415 A, 416

[56] References Cited

U.S. PATENT DOCUMENTS

| | | | |
|---|---|---|---|
| 1,761,265 | 6/1930 | Harris et al. | 56/228 |
| 1,930,855 | 10/1933 | MacGregor | 56/228 |
| 3,258,901 | 7/1966 | Van der Lely | 56/228 |
| 3,478,499 | 11/1969 | Van der Lely | 56/228 |
| 3,503,190 | 3/1970 | Van der Lely | 56/14.6 |
| 4,166,351 | 9/1979 | Nienberg | 56/228 |
| 4,359,854 | 11/1982 | Witzel | 56/228 |
| 4,409,780 | 10/1983 | Beougher et al. | 56/228 |

Primary Examiner—Robert Peshock
Assistant Examiner—John Weiss
Attorney, Agent, or Firm—Adrian D. Battison; Stanley G. Ade; Murray E. Thrift

[57] ABSTRACT

A harvesting machine particularly a swather comprises a frame carrying twin headers across the front of the frame and abutting centrally of the frame. The headers are mounted on pivot couplings arranged at respective front corners of the frame and of a type which allows the header to rotate through ninety degrees to a position along side the frame while at the same time causing the header to twist abut a longitudinal axis so that when it reaches a transport position along side the frame it is also raised. The movement from field transport position can be obtained by driving ground wheels at the outer ends of the headers. The reels can be moved longitudinally of the headers to accommodate pivotal movement of the headers caused by variations in field height.

16 Claims, 6 Drawing Figures

HARVESTING MACHINE WITH TWIN HEADERS

BACKGROUND OF THE INVENTION

This invention relates to a machine for harvesting a standing crop and particularly although not exclusively to a swather that is a windrower, or combine in which the standing crop is cut and transported laterally to a central position on the machine.

There has been a move in recent years for all farm machinery to increase in size so that it can operate on larger and larger widths of field or crop in one passage thus reducing the movement of heavy machinery over the field and reducing time and fuel usage.

In swathers, this increase in size has been provided by increasing the width of a single swather that is a single blade and reel arrangement mounted on a table which is transported across the field either by being self-propelled or by being drawn by a tractor. There is however a limit to the width which can be achieved in this manner since any variations in ground height will cause a variation in the height of action of the knife on the crop. Attempts have therefore been made to mount two separate headers or swathers on a single frame. Various proposals have mounted these on the front and sides of a tractor or propulsion unit. In an alternative arrangement which is towed by a tractor the swathers are mounted in echelon with one rearwardly of and towed by the first.

One particular problem with swathers is that of moving the swather to a transport position so that it can be driven on conventional roads or highways since in many cases the farmer must negotiate such highways to move from one field to another. In many cases therefore the swather can pivot from a working position in which it is transverse to the direction of movement to a transport position in which it is longitudinal to the direction of movement. However, in arrangements where the swather is positioned forwardly of the tractor or propulsion unit, such movements to transport position have been very limited or totally absent thus making the swather very difficult to transport.

It is one object of the present invention, therefore, to provide a new design of swather, combine or other harvesting machine which increases the width of operation of the machine by providing twin or double headers and yet mounts the headers in a manner which is convenient for movement to a transport position.

According to a first aspect of the invention, therefore, there is provided a machine for harvesting a standing crop comprising a frame a having a front end and a pair of sides, ground wheels for supporting the frame for driving movement across a field to be harvested, a pair of headers for cutting the standing crop each including knife means for cutting the crop and means thereon for transporting the cut crop transversely of the direction of motion, and means mounting the headers on the frame at the front end thereof such that, in a working position thereof, the headers abut at the front end and extend outwardly therefrom to respective sides of the frame, said mounting means including pivot coupling means where-by each said header can pivot from said working position to a transport position in which it lies along a respective side of the frame generally parallel to the direction of movement.

Preferably the twin headers are arranged to abut centrally of the frame and are mounted on pivot couplings arranged at front corners of the frame that is spaced from the end of the respective header whereby pivotal movement about the pivot coupling causes the swather to move from the working position to a transport position along side the side of the frame.

Preferably also the pivot couplings arrange to be of a type which causes movement of the header to a raised position where the knife means is lifted to lie along side the frame as the header is pivoted into the transport position.

Such a pivotal coupling can be provided by a pair of pivot members with the axis of movement thereof arranged inclined relative to the working and transport positions in such a way that the pivot movement through ninety degrees toward the transport position also causes the pivotal movement upward of the knife.

A machine of this type therefore enables cutting of a swath of for example forty-eight feet in width using two twenty-four foot headers and at the same time the headers can be pivoted around and inwardly into the transport position thus reducing the width of the swather to the order of fifteen feet which provides a legally transportable unit.

Preferably the movement from the working to the transport positions is achieved by driving ground wheels of the outer ends of the headers in forward or reversed directions as required.

According to a second aspect of the invention, there is provided a machine for harvesting a standing crop comprising a frame having a front end and a pair of sides, ground wheels for supporting the frame for driving movement across a field to be harvested, a pair of headers for cutting the standing crop each including means for cutting the crop and means thereon for transporting the cut crop transversely of the direction of motion, means mounting the headers on the frame at the front end thereof such that, in a working position thereof, the headers abut at the front end and extend outwardly therefrom to respective sides of the frame, and pivot coupling means mounting one of said headers on said frame such that it can pivot from said working position to a transport position in which it lies along a respective side of the frame generally parallel to the direction of movement and such that as it pivots the cutting means thereof is raised upwardly and inwardly toward the frame.

Such an arrangement can be manufactured particularly on a combine where substantially a conventional fixed header extends from one adjacent front corner of the frame outwardly toward and beyond the opposed side, and the moveable pivotal header is fixed at the same front corner for pivotal movement to a transport position along the one side.

In accordance with a further preferred feature, reels on the headers are mounted upon reel arms which allow movement of the reels longitudinally of the reel so that the reels can be arranged to abut at the center of the frame while over-lapping thereof is avoided on lifting of the outer end of one or both of the headers.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
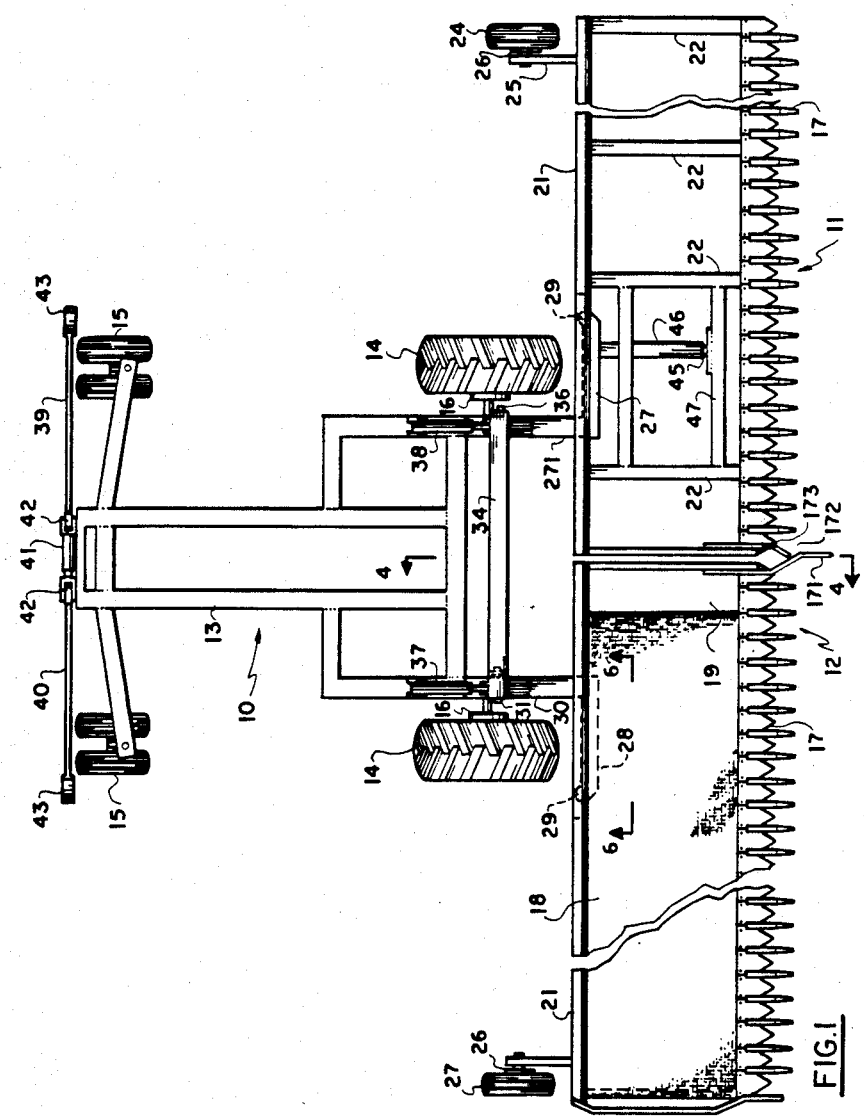
FIG. 1 is a simplified plan view of a harvesting machine or swather according to the invention showing the headers in the working position.

The swather illustrated in the drawings comprises generally a frame section 10 carrying a pair of headers 11 and 12. The frame 10 comprises a chassis 13 supported on four ground wheels, two of which are front wheels and are illustrated at 14 and two of which are rear wheels illustrated at 15. The front wheels 14 are driven by hydraulic motors 16 controlled and driven by a hydraulic supply system which is not illustrated as it is of a conventional type but is arranged to provide the motor power for the frame and also to provide differential speed between the front wheels thus causing steering movements of the frame. The rear wheels are castor wheels which merely act to follow the motion as controlled and provided by the front wheels 14.

Each of the headers 11 and 12 is generally of conventional configuration including a sickle knife 17 driven by a mechanism not shown. In addition, the header includes a canvas 18 rearward of the sickle knife 17 for carrying the cut crop to an opening through which it falls to form a swath. In this case the opening indicated at 19 is arranged centrally of the swather that is at the inner end of each of the headers so that a single swath is formed centrally of the machine. In other arrangements two separate swaths can be formed by providing the opening centrally of each of the headers but this is not illustrated as it will be well within the skill of one in art.

Figure 4:
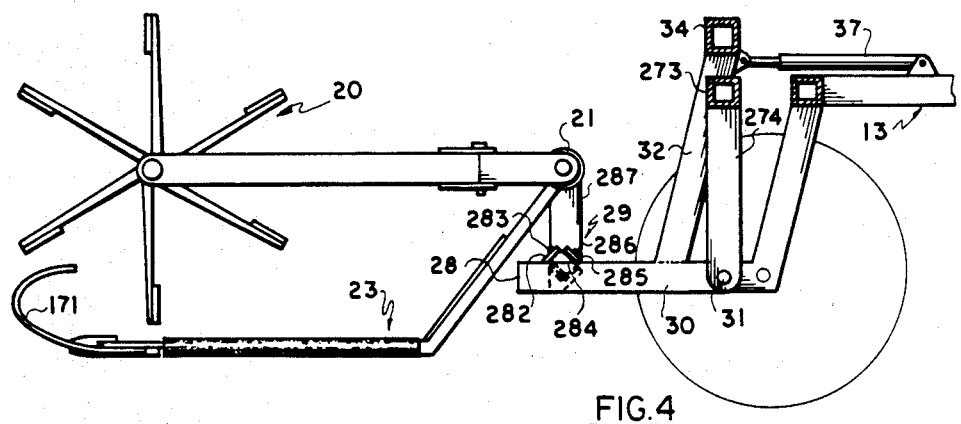
FIG. 4 is a cross sectional view along the lines 4—4 of FIG. 1.
Figure 3:
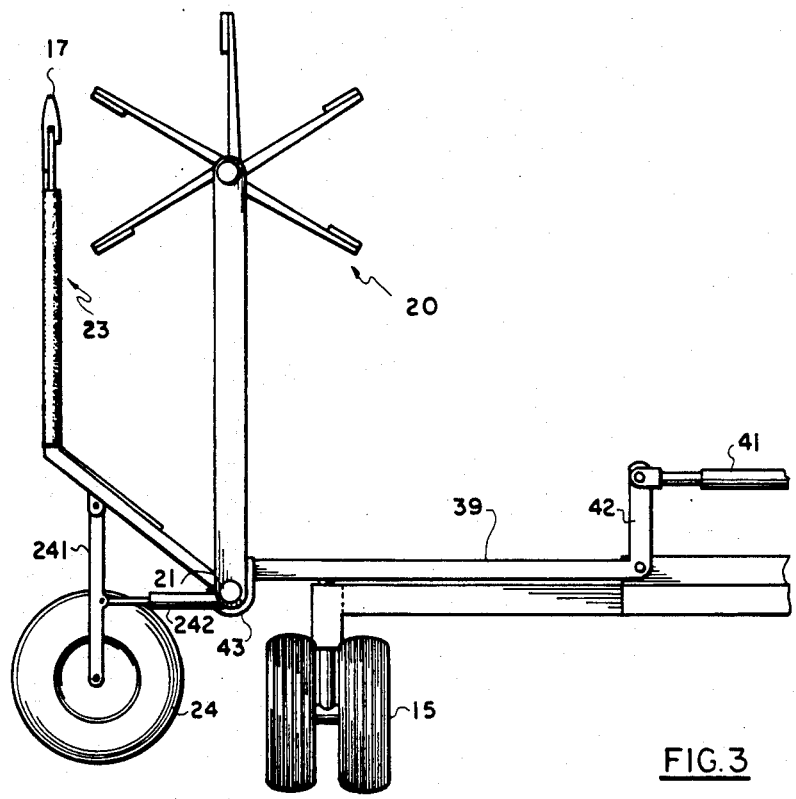
FIG. 3 is a rear elevational view of the machine of FIGS. 1 and 2 showing the header in the transport position of FIG. 2.

Each header further includes a reel 20 of conventional shape shown in FIGS. 3 and 4 but are omitted from FIG. 1 for convenience of illustration.

The header is supported upon a main beam 21 in the form of a tube which extends along the full length of the header. From that tube is supported a number of forwardly extending struts 22 which initially extend downwardly and then forwardly as best shown in FIG. 4 for providing a table area generally indicated at 23 at which the canvas is located for transport of the crop as previously explained.

The outer end of each of the headers is supported on a ground wheel 24 fixed on an axle and support 25. Each of the wheels 24 is driven by a hydraulic motor 26 supplied by the hydraulic system on the frame 10 in parallel to the supply to the wheels 14. In normal movement in the working position the left hand wheel 14 of the frame is coupled in parallel to the drive to the left hand wheel 24 and similarly the right hand wheels are coupled as a pair and thus the unit can be steered by differential supply in fluid to the two pairs.

Figure 2:
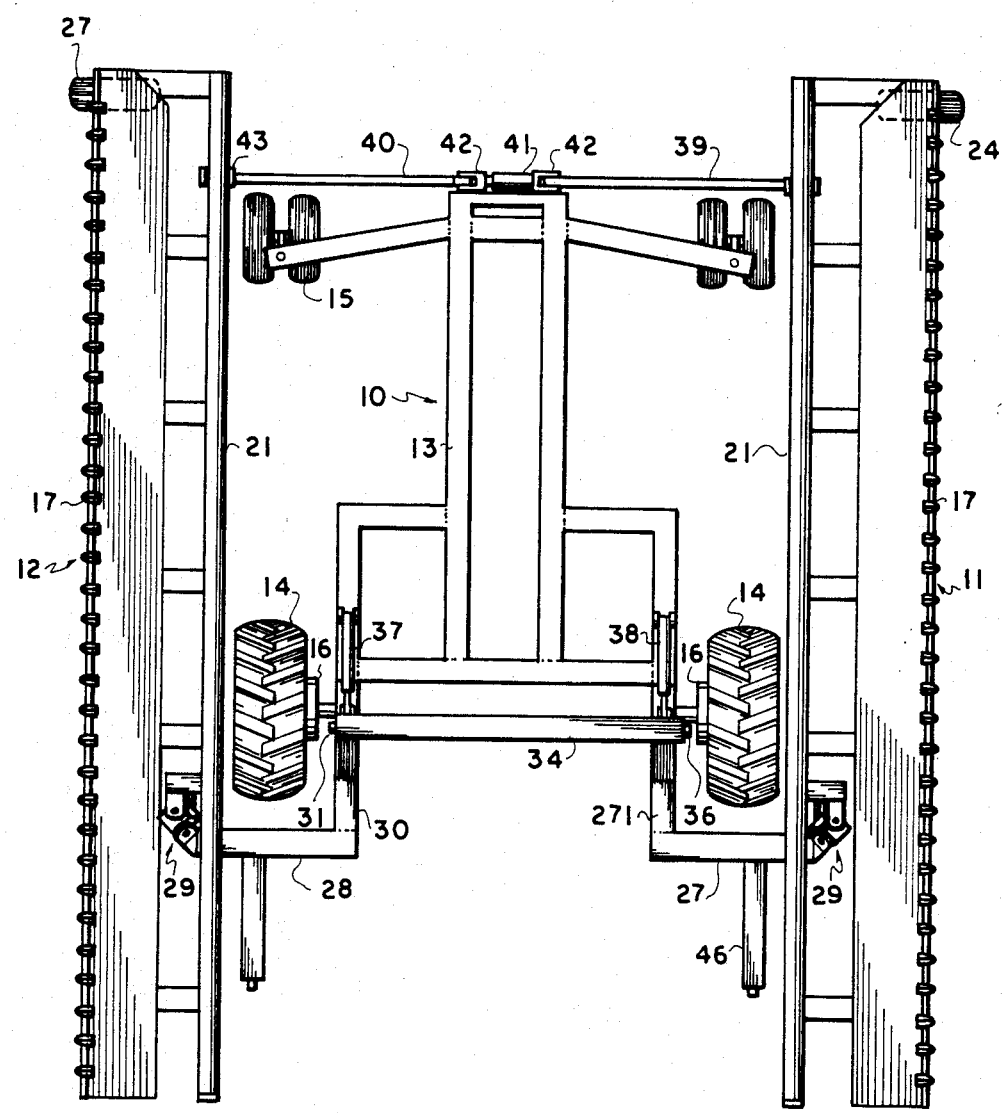
FIG. 2 is a top plan view similar to FIG. 1 showing the swather with the headers in the transport position.

When moving from the field position or working position shown in FIG. 1 to the transport position, this can be achieved by valve arrangements (not shown) whereby the wheels 14 can be held stationary and the wheels 24 reversed in direction so as to draw the headers rearwardly and inwardly to the position shown in FIG. 2.

Figure 5:
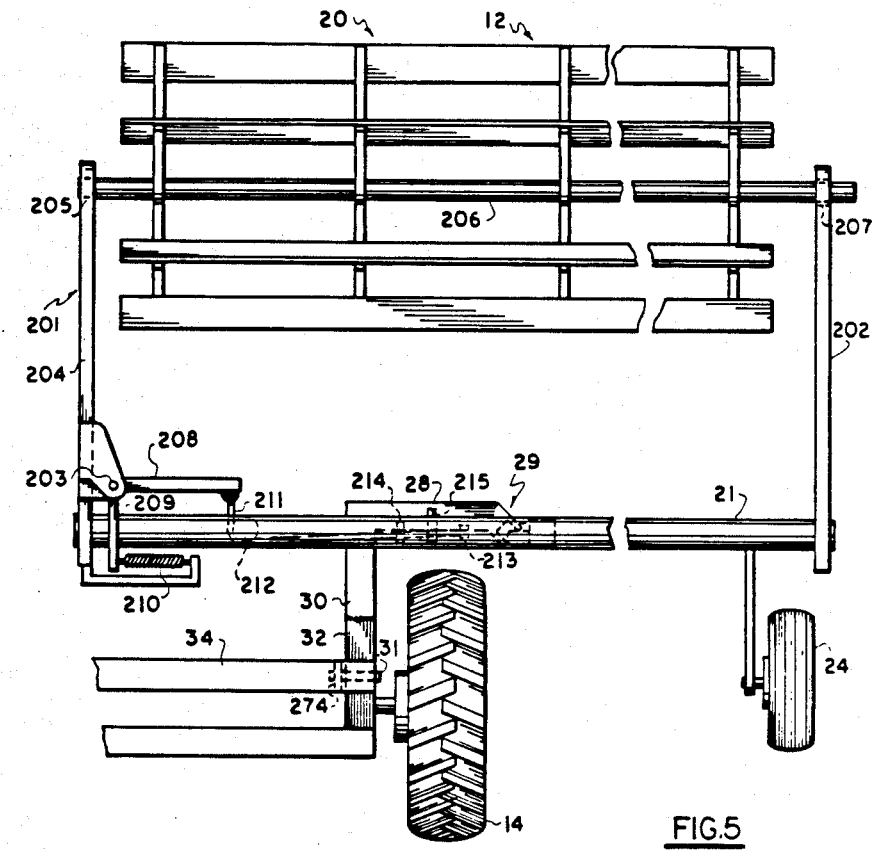
FIG. 5 is a plan view on an enlarged scale of one of the headers of FIG. 1 and a part of the frame to which it is attached.
Figure 6:
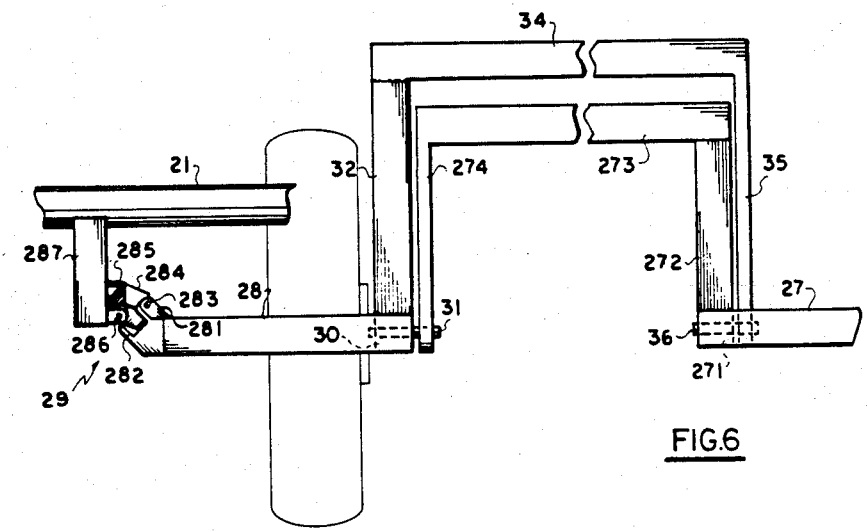
FIG. 6 is a view along the lines 6—6 of FIG. 1 on an enlarged scale.

Each of the headers is mounted on a respective one of a pair of lift arms 27, 28 which can be pivoted to adjust the angle of the header that is the height of the blade relative to the ground. The lift arms 27 and 28 are coupled to the respective tubular beam 21 by a pivot coupling 29 shown schematically in FIG. 1 and in more detail in FIGS. 4, 5 and 6. Generally the pivot coupling 29 comprises a pair of simple pivots which are arranged at a suitable angle so that they allow pivotal movement of the beam 21 through an angle of ninety degrees about a vertical axis from a position shown in FIG. 1 to the position shown in FIG. 2 and at the same time they cause rotation of the beam 21 about an axis thereto through an angle of the order of ninety degrees from the position best shown in FIG. 4 in which the knife is arranged adjacent the ground and the table 23 is substantially horizontal to the position best shown in FIG. 3 in which the knife is raised and the table 23 is substantially vertical. It will of course be appreciated that this movement which is achieved automatically by the pivot coupling as will be explained in more detail hereinafter causes the header to move from the proper working position as shown in FIG. 4 to a storage position or transport position as shown in FIG. 3 in which the width of the header relative to the frame is substantially reduced so that the whole width of the frame and the two headers can be reduced to approximately fifteen feet for highway transportation.

Specifically the pivot coupling 29 comprises generally a universal joint which is connected to the arm 28 by a portion 281 which extends rearwardly upwardly and outwardly at approximately forty-five degrees to the horizontal outwardly extending lift arm 28. The portion 281 carries a yoke 282 defining a pivot axis for a pivot pin 283 with the axis lying at approximately forty-five degrees to vertical planes forwardly and transversely to the frame and also a horizontal plane passing therethrough. The pin 283 is in a preferred embodiment dispose at an angle of 54.74 degrees relative to the vertical. The pin carries a pivot block 284 which in turn cooperates with a yoke 285 via a pin 286 arranged at right angles to the pin 283. The yoke 285 is coupled to a support strut 287 which in turn is welded to the tubular beam 21. In the working position of FIG. 1, the pin 286 is disposed at an angle of forty-five degrees from the horizontal with the axis thereof aligned along a line extending upwardly and rearwardly. In the transport position, the pin 286 is disposed at an angle of forty-five degrees from the horizontal. However, the end of the pin 286 which was low in the working position is high in the transport position. This accounts for the ninety degree rotation of the table 23 about an axis parallel with the knife which occurs when the header is rolled back from the working position to the transport position. The strut 287 is substantially vertical when the swather is in the working position but swings to be substantially parallel to lift arm 28 in the transport position.

The pivot coupling described above is only one way in which the common movement described above can be obtained. This technique has the particular advantage that the upward movement of the knife is obtained automatically merely by rotating the header toward the transport position by driving the wheel 24 without necessity for any further controls or motive power.

The lift arm 28 is coupled via a rearwardly extending portion 30 to a pivot 31 whereby the lift arm can be raised and lowered to obtain raising and lowering of the table 23 about the pivot 31. The rearward portion 30 is connected by an upward strut 32 which is inclined rearwardly to a horizontal transverse beam 34 which extends across the front of the frame. The right hand end of the beam 34 is connected by a strap 35 to a second pivot 36 aligned with a pivot 31 but spaced therefrom to the opposed side of the frame. Thus, the pivot 31 is arranged adjacent the right hand wheel 14 and the pivot 36 is arranged adjacent the left hand wheel 14. In a symmetrical manner the lift arm 27 is connected via a rearwardly extending strut 271 to an upwardly extending strut 272 visible in FIG. 6. A horizontal beam 273 extends across the front of the frame and is connected to a downward strap 274 at the opposed end of the beam which is in turn coupled to the pivot 31. The length of the strut 272 and the strap 274 is arranged relative to the strut 32 and strap 35 so that the beam 273 passes under the beam 34 and thus both can be actuated independently.

Actuation is obtained by respective hydraulic cylinders 37, 38 which act upon on the beams 34, 273 respectively. The provision of an accumulator on the cylinders 37, 38 can provide a floating action for the headers as conventionally required.

The lift arms 27, 28 can be lifted as previously described but are also held against twisting by the double pivot arrangement 30, 36 and the rectangular frame associated therewith which is mounted with pivotal movement on those pivots. The positioning of the pivot 31 adjacent the wheel axis i.e. at a low height provides a better angle of movement about the wheel and reduces the tendency of the header to dig into the ground if it engages a high point.

Turning now to FIGS. 1 and 3, it is noted that at a rear end of the frame there is provided a pair of lift arms 39, 40 which are actuated by a cylinder 41 by a crank portion 42 only one of which is shown in FIG. 3. The lift arms have on an outer end thereof a hook 43 which can engage under the tubular beam 21 when it is moved by the wheel 24 into the most inward position. When engaged the lift arms can be lifted to raise the beam 21 a short distance merely to lift the wheel 24 from the ground. The wheel 24 is pivotally mounted on the header by a strut 241 and actuable by a cylinder 242 to retract the wheel into a raised position as shown in FIG. 3. In the field position, the cylinder 242 can be used to adjust the height of the outer end of the header.

In the transport position shown in FIG. 3 the frame can be moved forwardly under the power of the wheels 14 with the headers supported on the hooks 43 and on the pivot couplings 29. In order to return the headers to the working position, the reverse process is carried out that is the lift arms 39 are lowered so that the wheel 24 engages the ground and is released from the hook 43. The wheel 24 can then be lowered by the cylinder 242 and driven in a forward direction to move the header through ninety degrees around the pivot 29 as previously explained to the position illustrated in FIG. 1.

In order to maintain the header rigidly in the working position shown in FIG. 1, a latch 45 in the form of a sliding shaft is provided on a strut 46 extending forwardly from the lift arm 27. The latch cooperates with a horizontal strut 47 interconnecting two of the support struts 22 of the header. The latch is spring biased forwardly and can be retracted hydraulically or mechanically and engages a vertical slot in the strut 47 so as to avoid inadvertent pivoting movement of the header about a vertical axis when it is intended to be in the working position. A symmetrical latch arrangement is provided for the right hand header 12 but is not visible in view of the canvas 18.

In the working position, the pivot coupling 29 and the latch 45 allow pivotal movement of the header about a substantially horizontal axis defined by a line joining the coupling 29 and the end of the latch generally forwardly of the frame so as to accommodate lifting or lowering of the wheel 24 relative to the wheel 14 as the level of the ground changes. This pivotal movement will of course raise and lower the inner end of the headers which effectively abut centrally of the frame. Only one of the headers is shown in plan view in FIG. 5 but it will be appreciated that the other header 11 is arranged in abutting relation therewith. It will be appreciated that the pivoting movement of the headers due to changes in ground level will cause the reels 20 to change in position relative to one another and this movement is accommodated by allowing longitudinal movement of the reels relative to each of the headers.

Specifically each reel is mounted upon a pair of reel arms 201, 202 supported upon the main beam 21. In conventional manner these arms may be lifted in pivotal movement about the beam 21 to raise and lower the reel but the mechanism for achieving this movement is not shown for convenience of illustration. The arm 201 includes a hinge 203 so that an outer portion 204 thereof can pivot in a direction longitudinal of the header to carry a bearing 205 for the reel inwardly and outwardly to move the whole reel in that direction. An opposed end of the shaft 206 of the reel slides through an opening 207 in the arm 202 so the shaft can move longitudinally under control of the arm 201. The arm 204 at the hinge 203 is connected to a pair of cranks 208, 209.

The crank 209 is spring biased by a spring 210 to bias the arm 201 inwardly against a stop defined by the hinge 203 and towards the opposite header so that normally the arms 201 of the headers reduce to a minimum any gap between the reels which could interfere with the proper collection of crop. The crank 208 is connected to a cable 211 which wraps around the tube 21 and passes around a pulley 212 beneath the tube to change directions so that it runs along underneath the tube through a guide 214 to an anchor 213 both of which are attached to the tube 21. Roller 215 is mounted on a strut extending upwardly from the arm 28 so as to engage the cable between the guide 214 and the anchor 213.

This arrangement provides adjustment of the position of the reel dependent upon two factors. Firstly the height of the reel in that as the arm 204 is raised, this acts to rotate the crank 208 about the tube 21. As the cable 211 is held fixed at that point, this rotation around the tube 21 also tends to draw the crank 208 closer to the tube 21 thus pivoting the arm 204. Secondly raising and lowering movements of the outer end of the header causes relative movement between the tube 21 and the support arm 28 thus increasing or reducing the overlap between the guide 214 and the anchor 213 on the tube 21 and the roller 215 on the arm 28. This movement acts to retract or release the cable 211 so as to pivot or release the arm 204.

Thus automatically the position of the arm 204 is adjusted depending upon the level of the wheel 24 of the header and of the height of the reel so that the arms 204 are maintained in proper position without contacting during operation of the headers.

In order to ensure that crop in the area adjacent the junction between the two headers is properly cut, guides 171 and 182 are provided at the inner corners of the headers. The guide 171 is longer than the guide 172 and projects further forwardly to overlap the guide 172. The guide 172 is mounted on a spring 173 to avoid any damage should contact between the guides occur.

In a modified arrangement (not shown) for use when swathing a bulky crop such a rape or flax, in which two separate swaths can be formed each centrally of the respective header, swath rollers can be mounted immediately rearwardly of the respective header and drawn thereby. When moving to a transport position, the swath roller can be moved inwardly to the frame by the header when it engages a ramp in an open area of the frame side to be lifted by the ramp from the ground for transport.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A machine for harvesting a standing crop comprising a frame having a front end and a pair of sides, ground wheels for supporting the frame for driving movement across a field to be harvested, a pair of headers for cutting the standing crop each including means for cutting the crop and means thereon for transporting the cut crop transversely of the direction of motion, means mounting the headers on the frame at the front end thereof such that, in a working position thereof, the headers abut at the front end and extend outwardly therefrom to respective sides of the frame, and pivot coupling means mounting at least one of said headers on said frame such that it can pivot from said working position to a transport position in which it lies along a respective side of the frame generally parallel to the direction of movement and such that as it pivots the cutting means thereof is raised upwardly and inwardly toward the frame.

2. The invention according to Claim 1 wherein the headers abut centrally of the front end of the frame and wherein both of said headers include pivot coupling means arranged such that each header pivots at a position adjacent a front corner of the frame and at a position on the header/spaced from an inner end thereof.

3. The invention according to claim 1 wherein the pivot coupling means comprises a first and a second pivot with the axes thereof arranged such that said pivoting movement of the header into said tranport position automatically pivots said cutting means into to said transport position.

4. The invention according to claim 3 wherein the pivot coupling means comprises a first pivot mounted on the frame and arranged to provide pivotal movement of a pivot member about an axis inclined to the working position and the transport position of the header and a second pivot mounted on the pivot member at right angles to the first and arranged to provide pivotal movement of the header relative to the pivot member.

5. The invention according to claim 1 including latch means for latching and retaining said header in the working position.

6. The invention according to claim 1 wherein said header includes a ground wheel at an outer end thereof.

7. The invention according to claim 1 wherein said header includes a ground wheel at an outer and thereof and wherein the ground wheel is arranged for driving in forward and reverse directions whereby driving of said ground wheel causes movement of the header between the working and transport positions.

8. The invention according to claim 6 including means for lifting said header in the transport position thereof whereby to raise said ground wheel from the ground.

9. The invention according to claim 1 wherein both of said headers include pivotal coupling means arranged to provide pivotal movement of each said header about a pivot axis longitudinal to the direction of movement, wherein each said header includes a reel and a pair of reel mounting arms each arranged at a respective end of the header for supporting the reel above the cutting means for rotation about an axis longitudinal of the header and wherein the reel mounting arms are arranged to allow longitudinal movement of the reel to avoid over-lap of the reels when the outer end of a header is raised relative to an inner end thereof.

10. The invention according to claim 9 including means for detaching movement of said header about said pivot axis causing said longitudinal movement of the reel in dependence upon the angular orientation of the header about said pivot axis whereby said reel is moved inwardly as the outer end is lowered and outwardly as the outer end is raised.

11. The invention according to claim 9 wherein the reel mounting arm at the inner end of the header includes hinge means allowing pivotal movement thereof to provide said longitudinal movement and wherein the reel mounting arm at the outer end of the header supports a shaft of the reel for sliding movement therethrough in said longitudinal movement.

12. The invention according to claim 10 wherein each of said headers includes means for lowering and raising said cutting means relative to the ground in said working position thereof independently of the other header.

13. The invention according to claim 1 wherein said mounting means includes lift arm means for raising and lowering the cutting means of the header in said working position relative to the ground and wherein said pivot coupling means is mounted on said lift arm means.

14. The invention according to claim 13 including latch means for latching said header in said working position wherein said latch means is mounted on said lift arm means.

15. A machine for harvesting a standing crop comprising a frame having a front end and a pair of sides, ground wheels for supporting the frame for driving movement across a field to be harvested, a pair of headers for cutting the standing crop each including means for cutting the crop and means thereon for transporting the cut crop transversely of the direction of motion, means mounting the headers on the frame at the front end thereof such that, in a working position thereof, the headers abut at the front end and extend outwardly therefrom to respective sides of the frame, pivot coupling means mounting one of said headers on said frame such that it can pivot from said working position to a transport position in which it lies along a respective side of the frame generally parallel to the direction of movement and such that it can pivot about a pivot axis longitudinally to the direction of movement, each of said headers including a reel and a pair of reel mounting arms each mounting arm being arranged at a respective end of the header for supporting the reel above the cutting means for rotation about an axis longitudinal of the header and for raising and lowering the reel to adjust the height thereof relative to the cutting means, said reel mounting arms of said one of said headers being arranged to allow longitudinal movement of the reel to avoid overlap of the reels when the outer end of said one header is raised relative to an inner end thereof, each of said headers including means for lowering and raising said cutting means relative to the ground in said working position thereof independantly of the other of the headers, and detecting means for detecting movement of said one of said headers about said pivot axis thereof, said detecting means being responsive to the height of the reel and arranged to cause said longitudinal movement of the reel by an amount dependant upon the angular orientation of said one of said headers about said pivot axis thereof and the height of the reel thereof whereby said reel is moved inwardly as the outer end is lowered and outwardly as the outer end is raised.

16. The invention according to claim 15 wherein the reel mounting arm at the inner end of the header includes hinge means allowing pivotal movement thereof to provide said longitudinal movement and wherein the reel mounting arm at the outer end of the header supports a shaft of the reel for sliding movement therethrough in said longitudinal movement.

* * * * *